(12) United States Patent
Kawamura et al.

(10) Patent No.: US 8,873,501 B2
(45) Date of Patent: Oct. 28, 2014

(54) BASE STATION, USER DEVICE, AND METHOD USED IN MOBILE COMMUNICATION SYSTEM

(75) Inventors: Teruo Kawamura, Yokosuka (JP);
Yoshihisa Kishiyama, Yokosuka (JP);
Kenichi Higuchi, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 995 days.

(21) Appl. No.: 12/304,261

(22) PCT Filed: Jun. 13, 2007

(86) PCT No.: PCT/JP2007/061931
§ 371 (c)(1),
(2), (4) Date: Feb. 26, 2009

(87) PCT Pub. No.: WO2007/148583
PCT Pub. Date: Dec. 27, 2007

(65) Prior Publication Data
US 2009/0196249 A1    Aug. 6, 2009

(30) Foreign Application Priority Data

Jun. 19, 2006 (JP) ................................. 2006-169427
Aug. 22, 2006 (JP) ................................. 2006-225918

(51) Int. Cl.
*H04W 4/00* (2009.01)
*H04W 72/08* (2009.01)
(Continued)

(52) U.S. Cl.
CPC ......... *H04B 1/7143* (2013.01); *H04W 72/0406* (2013.01); *H04L 1/0026* (2013.01); *H04L 5/006* (2013.01); *H04W 48/08* (2013.01); *H04W 72/085* (2013.01); *H04L 5/0016* (2013.01); *H04W 68/00* (2013.01); *H04L 5/0044* (2013.01); *H04J 13/18* (2013.01); *H04L 5/0037* (2013.01); *H04L 1/1607* (2013.01); *H04L 5/0053* (2013.01); *H04L 1/0003* (2013.01); *H04W 88/08* (2013.01); *H04L 5/0007* (2013.01); *H04L 5/0094* (2013.01)
USPC ........................................................ 370/330

(58) Field of Classification Search
USPC ........................................................ 370/330
See application file for complete search history.

(56) References Cited

U.S. PATENT DOCUMENTS

2007/0160160 A1    7/2007 Kakura

FOREIGN PATENT DOCUMENTS

| TW | I243619 B | 11/2005 |
| WO | 9956405 A1 | 11/1999 |
| WO | 2005/062510 A1 | 7/2005 |

OTHER PUBLICATIONS

3GPP TR 25.814 V1.5.0 (May 2006), 3rd Generation Partnership Project; Technical Specification Group Radio Access Network; Physical Layer Aspects for Evolved UTRA, Release 7.*

(Continued)

*Primary Examiner* — Chirag Shah
*Assistant Examiner* — Majid Esmaeilian
(74) *Attorney, Agent, or Firm* — Osha Liang LLP

(57) ABSTRACT

A base station used in a mobile communication system employing a single carrier scheme for uplink transmission is disclosed. The base station includes a scheduler configured to allocate one or more uplink resource blocks to a user device according to uplink channel conditions of the user device; and a reporting unit configured to report scheduling information indicating the allocation result to the user device. An uplink control channel of the user device is mapped to a resource block in a transmission frame including multiple resource blocks according to a hopping pattern based on the scheduling information; and the uplink control channel is mapped to a resource block according to the same hopping pattern regardless of whether the uplink control channel is associated with a user data channel.

15 Claims, 14 Drawing Sheets

(51) Int. Cl.
*H04B 1/7143* (2011.01)
*H04W 72/04* (2009.01)
*H04L 1/00* (2006.01)
*H04L 5/00* (2006.01)
*H04W 48/08* (2009.01)
*H04W 68/00* (2009.01)
*H04J 13/18* (2011.01)
*H04L 1/16* (2006.01)
*H04W 88/08* (2009.01)

(56) References Cited

OTHER PUBLICATIONS

NPL document, 3GPP TSG RAN1#44, EUTRA SC-FDMA Uplink Resource Block, Resource Allocation and TP, Motorola, dated Feb. 13-17, 2006.*

NPL document 3GPP TR 25.814 V1.5.0 (May 2006), 3rd Generation Partnership Project; Technical Specification Group Radio Access Network; Physical Layer Aspects for Evolved UTRA, Release 7.*

International Search Report (English & Japanese) for PCT/JP2007/061931 mailed Aug. 14, 2007 (7 pages).

Written Opinion of ISA (Japanese) for PCT/JP2007/061931 mailed Aug. 14, 2007 (3 pages).

3GPP TSG-RAN WG1 Meeting #44, R1-060320 "L1/L2 Control Channel Structure for E-Utra Uplink" Denver, USA, Feb. 13-17, 2006 (6 pages).

Taiwanese Office Action for Application No. 096121785, mailed on Jul. 27, 2011 (7 pages).

esp@cenet Patent Abstract for Taiwanese Publication No. 1243619, publication date Nov. 11, 2005. (2 pages).

Russian Office Action for Application No. 2009100414, mailed on Jan. 24, 2011 (13 pages).

Extended European Search Report issued in counterpart European Patent Application No. 14166966.3 dated Jul. 7, 2014 (10 pages).

NTT DoCoMo et al.; "Multiplexing Method of Shared Control Channel in Uplink Single-Carrier FDMA Radio Access"; TSG-RAN WG1 #42bis, R1-051143; San Diego, USA; Oct. 10-Oct. 14, 2005 (9 pages).

* cited by examiner

FIG.5

| | RESOURCE BLOCK SIZE = LARGE | RESOURCE BLOCK SIZE = SMALL |
|---|---|---|
| IMPROVEMENT IN THROUGHPUT CAUSED BY SCHEDULING EFFECT | SMALL | LARGE |
| SIGNALING OVERHEAD | SMALL | LARGE |
| RESOURCE USE EFFICIENCY IN TRANSMISSION OF SMALL SIZED DATA | LOW | HIGH |

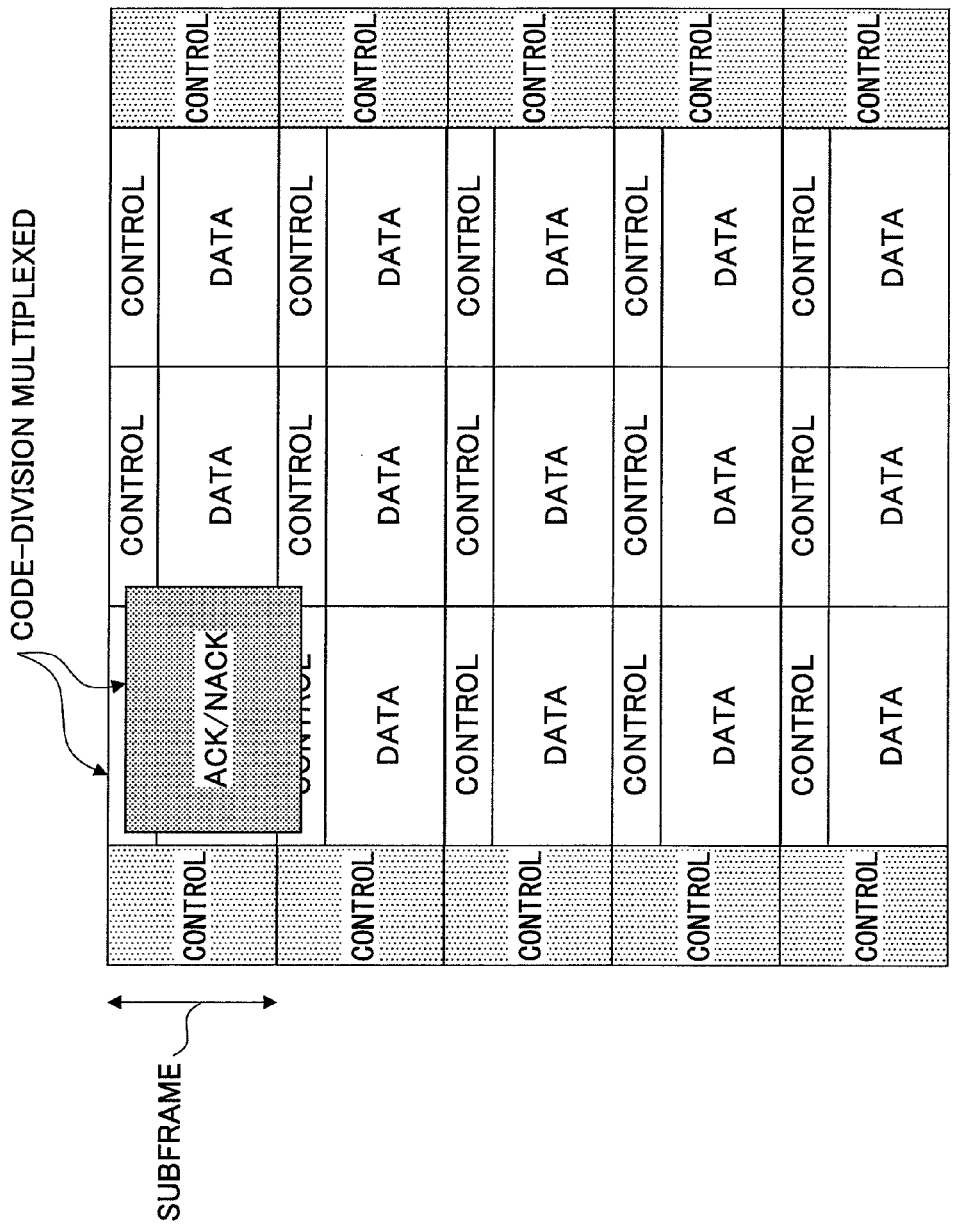

BASE STATION, USER DEVICE, AND METHOD USED IN MOBILE COMMUNICATION SYSTEM

TECHNICAL FIELD

The present invention generally relates to mobile communication technologies. More particularly, the present invention relates to a base station and a method used in a mobile communication system.

BACKGROUND ART

In the field of mobile communication technologies, research and development of next generation communication systems are being conducted at a rapid pace. In a currently proposed communication system, a single carrier scheme is to be used for uplink transmission to reduce the peak-to-average power ratio while achieving a wide coverage area.

In this communication system, uplink and downlink radio resources are allocated to users depending on their channel conditions in the form of shared channels to be shared by the users. The process of allocating radio resources is called "scheduling". In order to perform uplink scheduling properly, each user device transmits a pilot channel to a base station and the base station estimates the uplink channel conditions of the user device based on the reception quality of the pilot channel. Similarly, in order to perform downlink scheduling properly, the base station transmits a pilot channel to the user device and the user device reports information indicating the reception quality of the pilot channel (i.e., channel quality indicator (CQI)) to the base station. Then, the base station estimates the downlink channel conditions of the user device based on the CQI reported by the user device. Meanwhile, 3GPP, R1-060320, "L1/L2 Control Channel Structure for E-UTRA Uplink", Feb. 13, 2006 discloses a frequency scheduling method where resources (time and frequency) are allocated to a control channel of a user device according to a predetermined hopping pattern.

DISCLOSURE OF INVENTION

Problems to be Solved by the Invention

An uplink control channel may include either first control information (essential control information) that is always sent together with an uplink data channel or second control information that is sent regardless of the presence or absence of an uplink data channel. The first control information includes information, such as the modulation scheme and channel coding rate of a data channel, that is necessary to demodulate the data channel. The second control information includes a CQI, delivery confirmation information (ACK/NACK) for a downlink data channel, and/or a resource allocation request. In the method disclosed in "3GPP, R1-060320" described above, an uplink control channel including the second control information of a user device is basically transmitted in a time slot and a frequency selected according to a predetermined hopping pattern. On the other hand, when the user device transmits an uplink data channel, an uplink control channel including the first control information is transmitted using the same resource block as that of the uplink data channel. In other words, the uplink control channel including the first control information is simply transmitted together with the uplink data channel without conforming to the predetermined hopping pattern.

Meanwhile, unlike data channels, a control channel including the first control information or the second control information is basically not retransmitted even if the control channel is not correctly demodulated. Therefore, in a sense, achieving high-quality and secure transmission is more important for control channels than for data channels.

Also, even if the channel conditions of a resource block are good for a user device when scheduling an uplink data channel, the channel conditions may be different when the uplink data channel is actually transmitted by the user device. Therefore, even if an uplink control channel is transmitted using the same resource block as that of an uplink data channel, it is not guaranteed that the uplink control channel will be transmitted in good conditions as expected.

One object of the present invention is to increase the probability that an uplink control channel is transmitted with desired quality in a mobile communication system employing a single carrier scheme for uplink transmission.

Means for Solving the Problems

An aspect of the present invention provides a base station used in a mobile communication system employing a single carrier scheme for uplink transmission. The base station includes a scheduler configured to allocate one or more uplink resource blocks to a user device according to uplink channel conditions of the user device; and a reporting unit configured to report scheduling information indicating the allocation result to the user device; wherein an uplink control channel of the user device is mapped to a resource block in a transmission frame including multiple resource blocks according to a hopping pattern based on the scheduling information; and the uplink control channel is mapped to a resource block according to the same hopping pattern regardless of whether the uplink control channel is associated with a user data channel.

Advantageous Effect of the Invention

An aspect of the present invention makes it possible to increase the probability that an uplink control channel is transmitted with desired quality in a mobile communication system employing a single carrier scheme for uplink transmission.

BRIEF DESCRIPTION OF THE DRAWINGS

FIG. 5 is a table showing relationships between resource block sizes and scheduling effect, signaling overhead, and resource use efficiency;

FIG. 14 is a drawing illustrating an exemplary configuration of an uplink frame.

EXPLANATION OF REFERENCES

Figure 1:
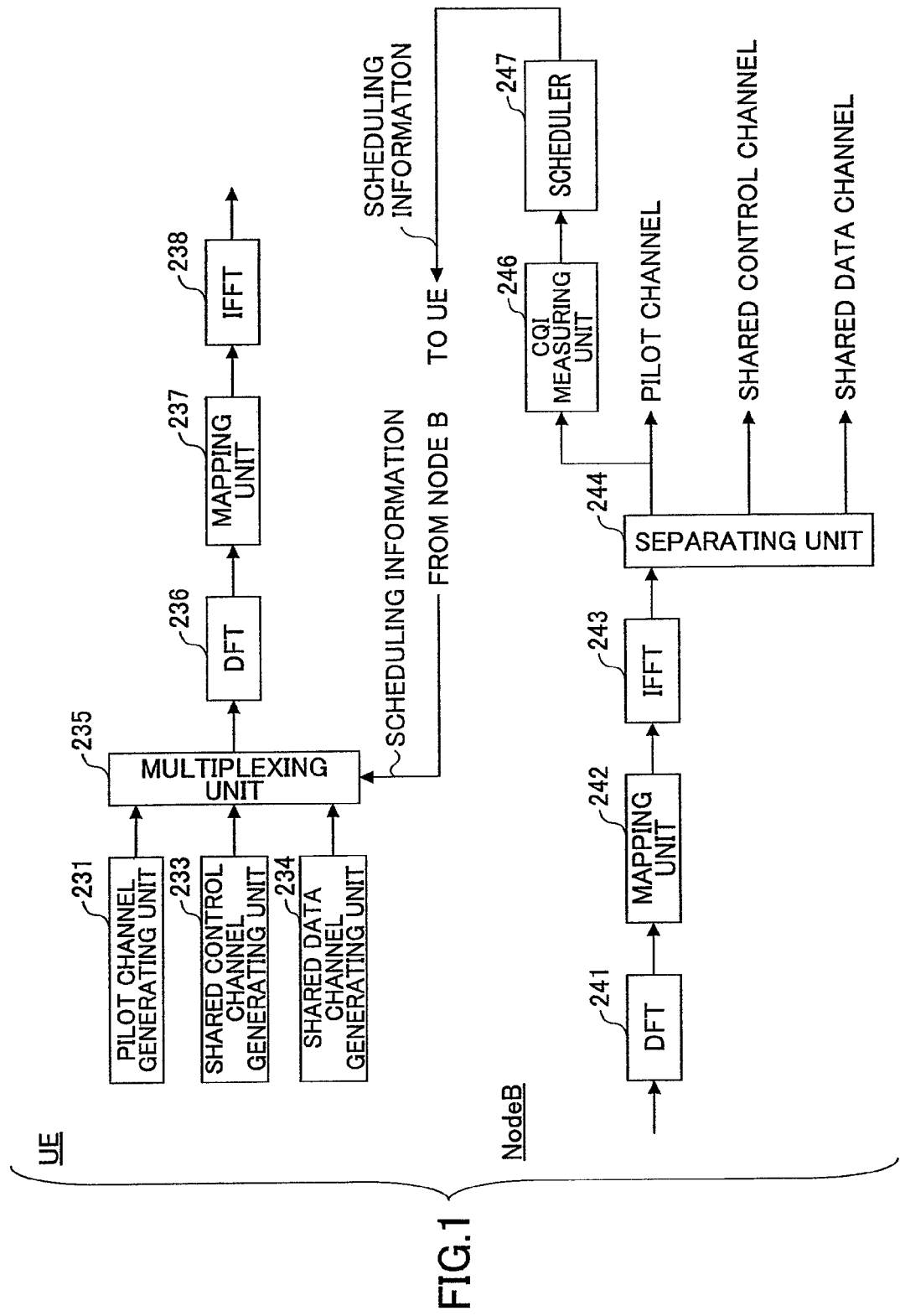
FIG. 1 is a drawing illustrating a user device and a base station according to an embodiment of the present invention.

21 Transmission bandwidth determining unit
22 Transmission band determining unit
23 Transmission band management unit
24 Code assignment unit
25 Code management unit
31 Transmit buffer
32 OFDM transmission unit
33 Scheduler
34 Pattern selecting unit
35 Memory
41 OFDM reception unit
42 Resource identification unit
43 Arrangement pattern determining unit
44 Memory
45 CQI measuring unit
46 Transmitting unit
131 Transmission signal sequence output unit
132 Discrete Fourier transform unit
133 Data mapping unit
134 Inverse Fourier transform unit
135 Transmission frame timing adjusting unit
231 Pilot channel generating unit
233 Shared control channel generating unit
234 Shared data channel generating unit
235 Multiplexing unit
236, 241 Discrete Fourier transform unit
237, 242 Mapping unit
238, 243 Inverse fast Fourier transform unit
244 Separating unit
246 CQI measuring unit
247 Scheduler

BEST MODE FOR CARRYING OUT THE INVENTION

In the embodiments described below, various uplink channels are transmitted. Those uplink channels are roughly categorized into (A) uplink shared data channels, (B) shared control channels, and (C) pilot channels.

(A) Uplink Shared Data Channel

An uplink shared data channel (or an uplink data channel) includes traffic data and/or a layer 3 control message. The layer 3 control message may include handover information and information used for retransmission control. One or more resource blocks (may also be called frequency chunks) are allocated to an uplink shared data channel according to results of time and frequency scheduling. In the scheduling, the base station allocates resources in the time domain or in the time and frequency domains such that users with good channel conditions can transmit packets in preference to other users.

(B) Uplink Shared Control Channel

An uplink shared control channel (or an uplink control channel) is used to transmit a physical control message and a layer 2 control message (FFS). Therefore, an uplink control channel is also called an L1/L2 control channel. The base station performs scheduling and thereby allocates resource blocks to user devices such that contention of shared control channels is prevented. The base station performs scheduling for uplink shared control channels taking into account the number of users. In this case, it is preferable to perform accurate transmission power control to keep the packet error rate low. Also, uplink shared control channels are preferably transmitted across a wide frequency range to achieve frequency diversity gain and thereby to improve the reception quality of packets.

An uplink shared control channel includes one or more of (1) control information related to a scheduled uplink shared data channel, (2) control information related to a scheduled downlink shared data channel, (3) control information for changing scheduling parameters for an uplink shared data channel, and (4) control information for scheduling a downlink shared data channel.

The control information (1) related to a scheduled uplink shared data channel is transmitted together with the scheduled uplink shared data channel. In other words, the control information (1) is transmitted only when a scheduled uplink shared data channel is transmitted. The control information (1) is also called an associated control channel or essential control information and includes information (e.g., modulation scheme and channel coding rate) necessary to demodulate a shared data channel, a transmission block size, and information regarding retransmission control. The control information (1) is, for example, represented by 14 bits. The information regarding transmission control may include information indicating whether a packet to be transmitted via the uplink shared data channel is a retransmission packet or a new packet and information indicating the use of the retransmission packet. In a first use, the data of the retransmission packet is the same as the data (e.g., initial transmission data) of the previously transmitted packet. In a second use, the data of the retransmission packet may be different from that of the previously transmitted packet. In the second use, the retransmission packet may be combined with redundant information for error correction coding.

The control information (2) related to a scheduled downlink shared data channel is transmitted from a mobile station to a base station only when the scheduled downlink shared data channel transmitted by the base station is received by the mobile station. The control information (2) indicates whether a downlink packet is correctly received (ACK/NACK). The simplest form of the control information (2) may be represented by one bit.

The control information (3) for changing scheduling parameters for an uplink shared data channel is used to report a buffer size and/or transmission power of a mobile station to a base station. The control information (3) may be transmitted either regularly or irregularly. For example, the control information (3) may be transmitted by the mobile station when its buffer size and/or transmission power changes. The base station performs scheduling taking into account such parameter changes. A scheduling parameter such as a buffer size or transmission power may be represented, for example, by 10 bits.

The control information (4) for scheduling a downlink shared data channel is used to report downlink channel quality information (channel quality indicator (CQI)) of a mobile station to a base station. The CQI is, for example, represented by a received SIR measured by the mobile station. The control information (4) may be transmitted either regularly or irregularly. For example, the control information (4) may be transmitted to the base station when the channel quality changes. The control information (4) is, for example, represented by five bits.

(C) Pilot Channel

A pilot channel may be transmitted from a mobile station by time division multiplexing (TDM), frequency division multiplexing (FDM), code division multiplexing (CDM), or a combination of them. Among them, TDM is preferably used to reduce the peak-to-average power ratio (PAPR). Orthogonalizing a pilot channel and a data channel by TDM makes it possible to accurately separate the pilot channel at a receiving end and thereby makes it possible to improve the accuracy of channel estimation.

Below, the present invention is described in different embodiments. However, the distinctions between the embodiments are not essential for the present invention, and the embodiments may be used individually or in combination.

First Embodiment

FIG. 1 is a schematic block diagram illustrating a user device (user equipment: UE) and a base station (node B) according to an embodiment of the present invention. The user device shown in FIG. 1 includes a pilot channel generating unit 231, a shared control channel generating unit 233, a shared data channel generating unit 234, a multiplexing unit 235, a discrete Fourier transform unit (DFT) 236, a mapping unit 237, and an inverse fast Fourier transform unit (IFFT) 238.

The pilot channel generating unit 231 generates a pilot channel used for uplink.

The shared control channel generating unit 233 generates a shared control channel that may include various types of control information. As described above, a shared control channel includes (1) essential control information, (2) information indicating whether a downlink channel is correctly received: acknowledge (ACK) or negative acknowledge (NACK), (3) information for changing scheduling parameters, or (4) a channel quality indicator (CQI) indicating the reception quality of a downlink pilot channel.

The shared data channel generating unit 234 generates a shared data channel to be transmitted by uplink. The shared data channel and the shared control channel are modulated by a specified data modulation scheme and are encoded by a specified channel coding scheme.

The multiplexing unit 235 multiplexes one or more channels according to scheduling information sent from the base station and outputs the multiplexed signal (the scheduling information is also input to the units 231, 233, and 234). For uplink, various channel mapping patterns may be used. Therefore, it is not always necessary to multiplex all channels shown in FIG. 1. In other words, one or more of the channels are multiplexed as needed. In this example, the multiplexing unit 235 time-division-multiplexes channels and the mapping unit 237 maps the multiplexed signal to frequency components.

The discrete Fourier transform unit (DFT) 236 Fourier-transforms an input signal (in this example, the multiplexed signal). This discrete Fourier transformation is performed because the signal at this stage represents discrete digital values. As a result of this discrete Fourier transformation, a signal sequence arranged in order of time is represented in the frequency domain.

The mapping unit 237 maps discrete-Fourier-transformed signal components to subcarriers in the frequency domain. For example, the mapping unit 237 performs localized FDM or distributed FDM. In localized FDM, a frequency band is divided along the frequency axis into sub-bands corresponding to the number of users. In distributed FDM, phases of user signals are adjusted such that different sets of comb-like frequency components arranged at regular intervals are allocated to the respective users. Signal processing in this embodiment may be performed by any method where a signal is Fourier-transformed, processed in the frequency domain, and then inverse-Fourier-transformed as illustrated in FIG. 1. Alternatively, signal processing may be performed by variable spreading chip repetition factor-CDMA (VSCRF-CDMA). In either case, this embodiment makes it possible to handle a signal with multiple frequency spectra even in a system employing a single carrier scheme.

The inverse fast Fourier transform unit 238 inverse-fast-Fourier-transforms the mapped signal components and outputs a signal sequence arranged in order of time.

FIG. 1 also shows a base station according to an embodiment of the present invention. The base station shown in FIG. 1 includes a discrete Fourier transform unit (DFT) 241, a mapping unit 242, an inverse fast Fourier transform unit (IFFT) 243, a separating unit 244, a CQI measuring unit 246, and a scheduler 247.

The discrete Fourier transform unit (DFT) 241 Fourier-transforms an input signal (in this example, a received signal). As a result of this Fourier transformation, a signal sequence arranged in order of time is represented in the frequency domain.

The mapping unit 242 extracts subcarrier components from the Fourier-transformed signal. In other words, the mapping unit 242 extracts a signal multiplexed, for example, by localized FDM or distributed FDM.

The inverse fast Fourier transform unit 243 inverse-fast-Fourier-transforms the extracted signal components and outputs a signal sequence arranged in order of time.

The separating unit 244 separates one or more channels in the signal sequence and outputs the channels. In this example, the demapping unit 242 restores a signal mapped to frequency components to its original form before mapping and the separating unit 244 separates time-division-multiplexed signals.

The CQI measuring unit 246 measures the received signal quality (received SIR and/or CQI) of an uplink pilot channel and estimates channel conditions based on the measured signal quality.

The scheduler 247 allocates uplink resources to user devices based on channel conditions of the user devices (performs scheduling). The scheduler 247 allocates resources preferentially to user devices with good channel conditions. The base station also performs downlink scheduling. However, descriptions of the downlink scheduling are omitted here. The scheduler 247 sends scheduling information indicating allocation results to the user devices.

One or more channels generated by the channel generating units of the user device are time-division-multiplexed (switched appropriately) by the multiplexing unit 235 and the multiplexed signal is transformed into a signal in the frequency domain by the DFT 236. The transformed signal is properly mapped to frequency components by the mapping unit 237 and the mapped signal is transformed into a time-series signal by the IFFT 238. Then, the time-series signal is wirelessly transmitted via a processing unit such as a radio transmission unit (not shown). The transmitted signal is received by the base station. The received signal is transformed into a signal in the frequency domain by the DFT 241.

The transformed signal, which is mapped to frequency components, is restored to its original form before mapping by the demapping unit 242. The restored signal is transformed by the IFFT 243 into a time-series signal and the separating unit 244 properly separates time-division-multiplexed signals in the time-series signal. Then, a processing unit (not shown) further processes, e.g., demodulates, the signals. The CQI measuring unit 246 estimates uplink channel conditions based on a received pilot channel and the scheduler 247 performs uplink scheduling based on the uplink channel conditions and sends scheduling information indicating the scheduling results to the user device.

Figure 2:
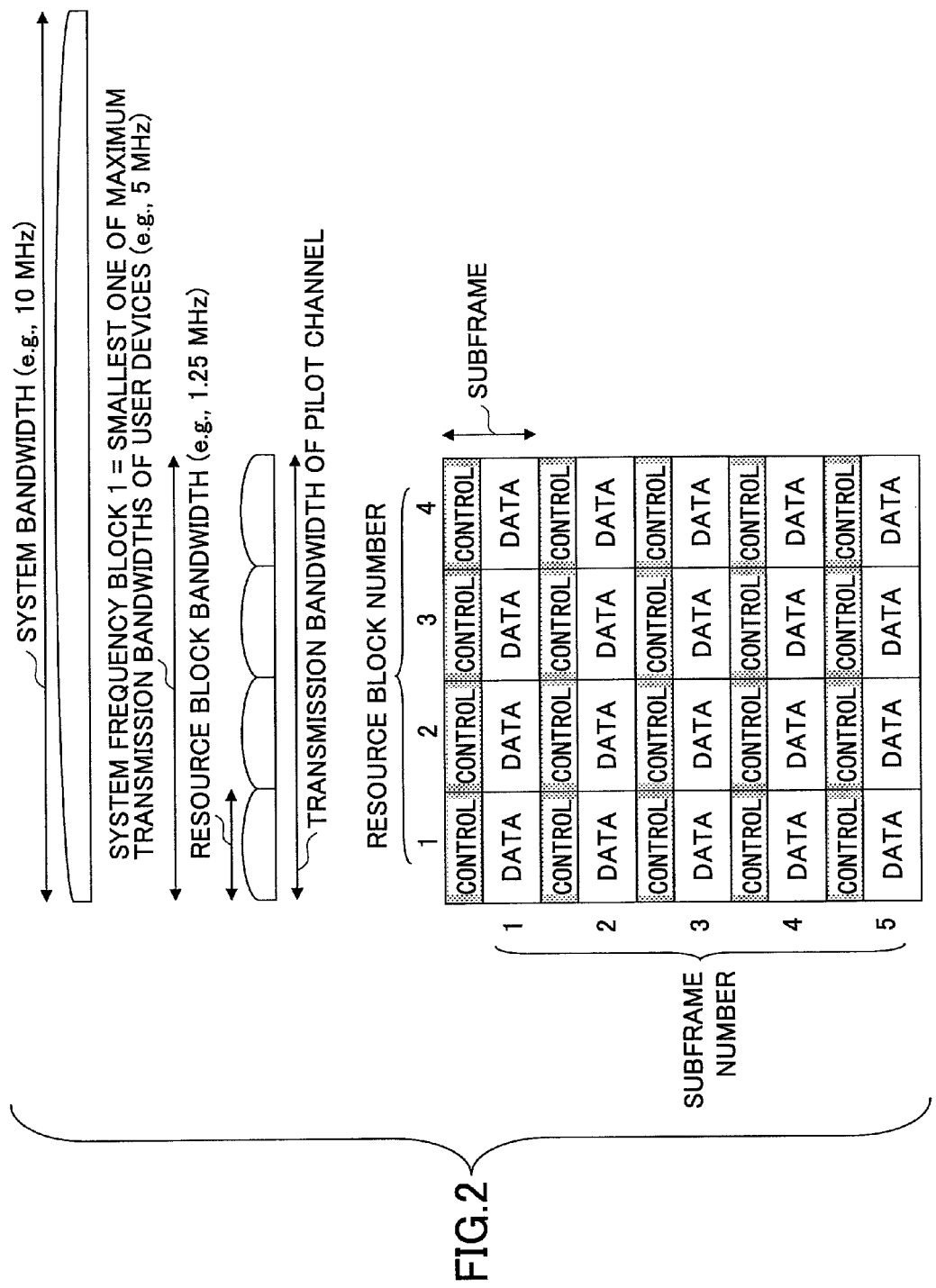
FIG. 2 is a drawing illustrating exemplary allocation of a frequency band used in a mobile communication system.

FIG. 2 is a drawing illustrating exemplary allocation of a frequency band used in a mobile communication system. A frequency band (may also be called an entire frequency band or a system frequency band) allocated to the mobile communication system includes multiple system frequency blocks. A user device performs communications using one or more resource blocks in a system frequency block. In this example, it is assumed that the system frequency band has a bandwidth of 10 MHz, each system frequency block has a bandwidth of 5 MHz, and the system frequency band includes system frequency blocks 1 and 2. For brevity, the system frequency block 2 is omitted in FIG. 2. Each system frequency block includes four resource blocks and each resource block has a bandwidth of 1.25 MHz. The base station assigns a user device to one of the two system frequency blocks according to the supported bandwidth of the user device and the number of currently communicating users in the system. A bandwidth supported by all user devices that may communicate in the system is selected as the bandwidth of the system frequency block. In other words, the maximum transmission bandwidth of a user device possibly having the lowest capability in the system is used as the bandwidth of the system frequency block. Therefore, for a user device supporting only a 5 MHz frequency band, either one of the two system frequency blocks is allocated. Meanwhile, for a user device supporting a 10 MHz frequency band, both of the system frequency blocks may be allocated. The user device transmits an uplink pilot channel using one or more resource blocks in the allocated system frequency block(s). The base station allocates one or more resource blocks for a shared data channel to be transmitted by the user device based on the reception level of the uplink pilot channel (performs scheduling). The scheduling results (scheduling information) are transmitted via a downlink shared control channel or any other channel to the user device. The user device transmits the uplink shared data channel using the allocated resource block(s).

Figure 3:
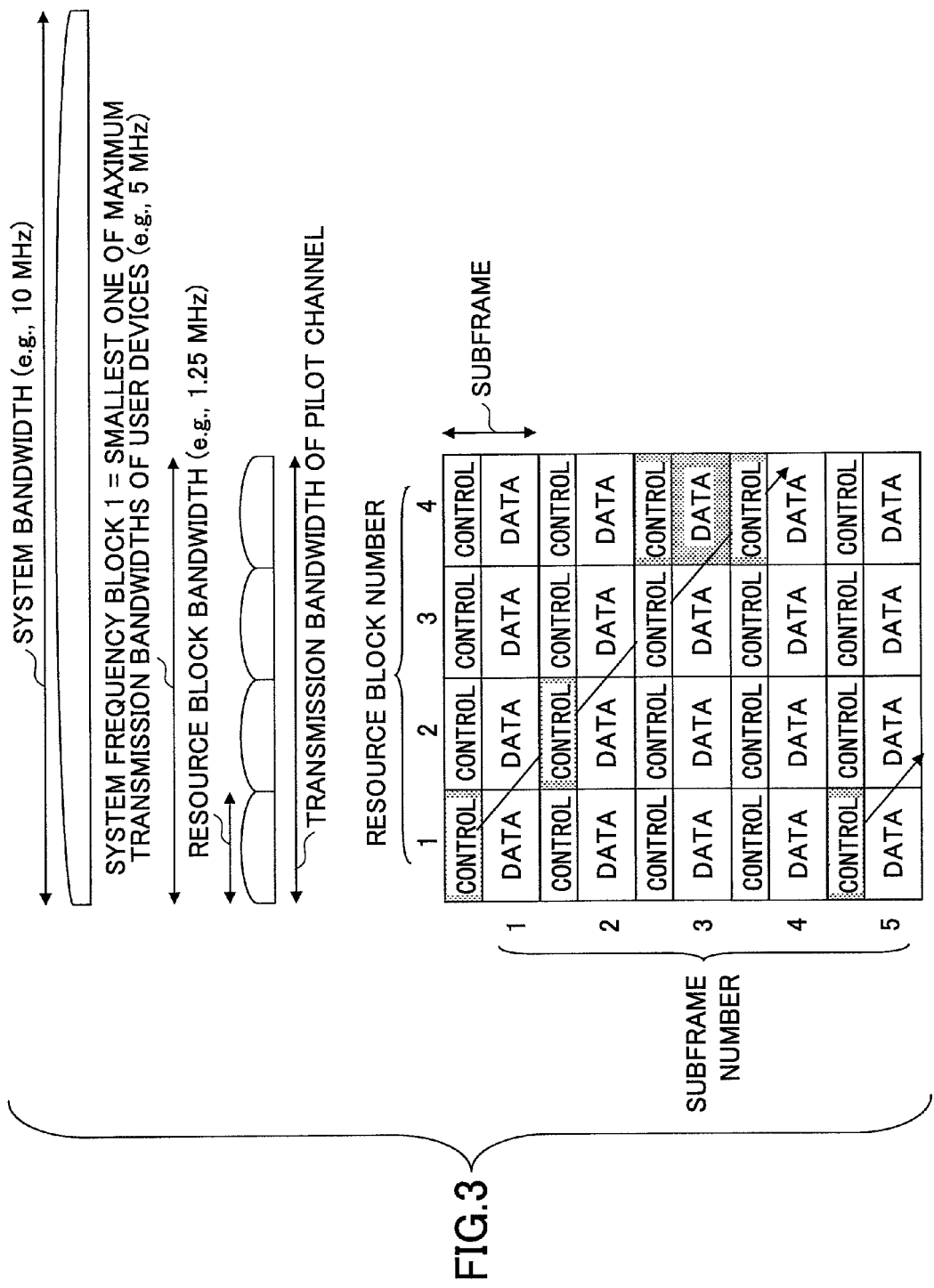
FIG. 3 is a drawing illustrating exemplary allocation of a frequency band used in a mobile communication system.

FIG. 3 shows an example where the resource block used by a user device to transmit a shared control channel changes as time passes. In FIG. 3, an uplink shared control channel of the user device is transmitted using one or more of the shaded portions of resource blocks. Resource blocks that can be used by the user device are determined according to a frequency hopping pattern indicated by arrows sloping downward. The frequency hopping pattern may be stored in the base station and the user device before the communication is started or may be sent from the base station to the user device as needed. In this frequency hopping method, various resource blocks are used to transmit uplink shared control channels. This in turn makes it possible to maintain the average signal quality of uplink shared control channels. The frequency hopping pattern shown in FIG. 3 is just an example and any other frequency hopping pattern may be used for the transmission of uplink shared control channels. Also, multiple frequency hopping patterns may be provided and an appropriate pattern may be selected from the provided frequency hopping patterns according to need.

In the example shown in FIG. 3, the user device transmits control information other than the essential control information in subframes excluding a third subframe (may also be called a transmission time interval (TTI)) that is placed third in order of time. In the third subframe, an uplink shared data channel and a shared control channel are transmitted using the rightmost resource block. Thus, in the third subframe, a resource block that does not conform to the frequency hopping pattern is used. Such an exception is reported by the base station via a shared control channel to the user device. Alternatively, whether an uplink control channel is transmitted using a dedicated resource block or transmitted together with an uplink data channel may be determined based on whether the uplink data channel is allocated a resource block and may be provided as a predetermined rule.

As described above, unlike data channels, a control channel including essential control information (the first control information) or other control information (the second control information) is basically not retransmitted even if the control channel is not correctly demodulated. Therefore, in a sense, achieving high-quality and secure transmission is more important for control channels than for data channels.

Also, even if the channel conditions of a resource block are good for a user device when scheduling an uplink data channel, the channel conditions may be different when the uplink data channel is actually transmitted by the user device. Therefore, even if an uplink control channel is transmitted using the same resource block as that of an uplink data channel, it is not guaranteed that the uplink control channel is transmitted in good conditions as expected.

Figure 4:
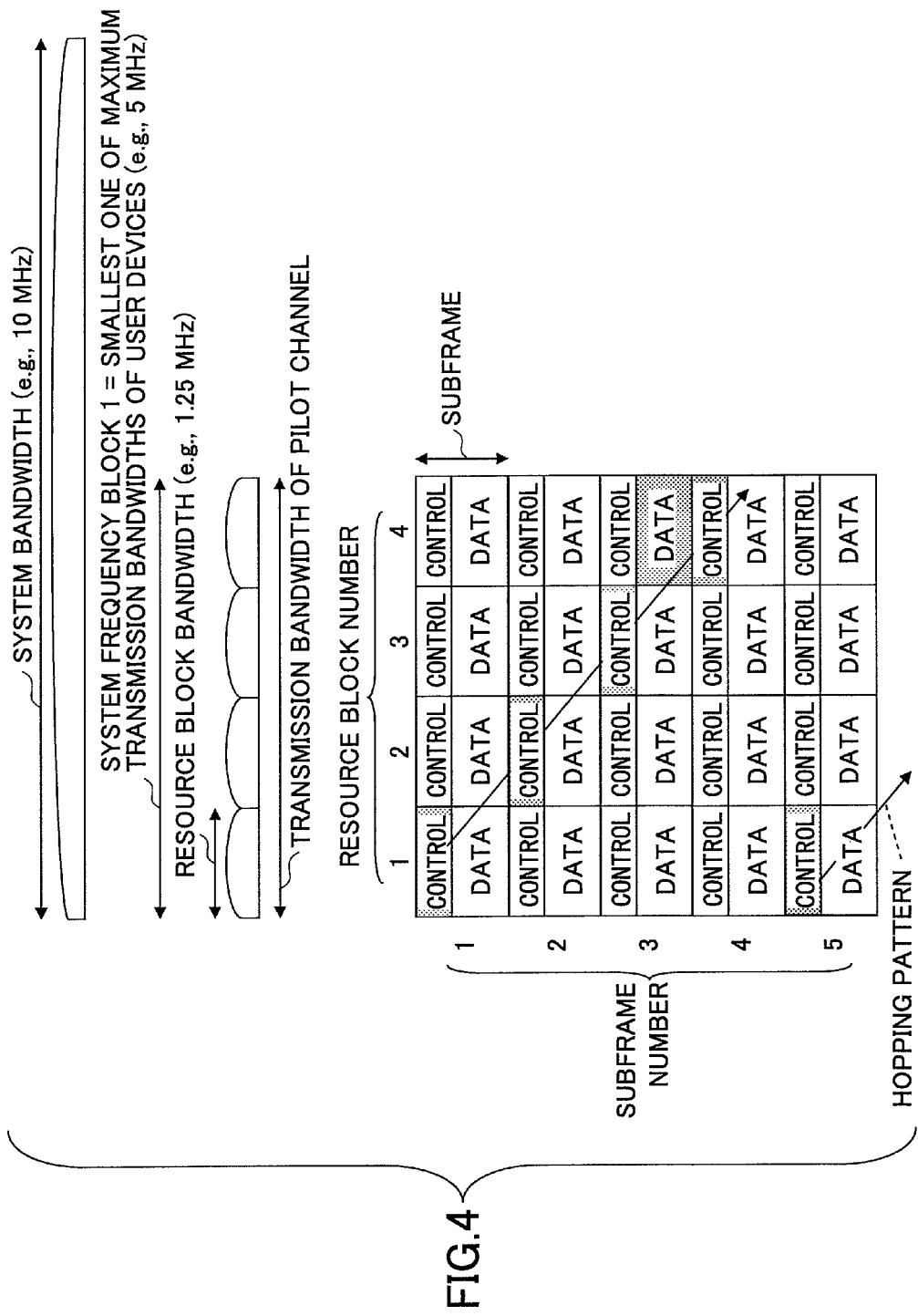
FIG. 4 is a drawing illustrating exemplary allocation of resources for a control channel and a data channel to be transmitted by a user device according to an embodiment of the present invention.

FIG. 4 is a drawing illustrating exemplary allocation of resources for a control channel and a data channel to be transmitted by a user device according to an embodiment of the present invention. In FIG. 4, an uplink control channel of a user device is transmitted according to a hopping pattern as in FIG. 3. Also, similar to the example shown in FIG. 3, the fourth resource block in the third subframe is allocated to a data channel. FIG. 4 is different from FIG. 3 in that a control channel is transmitted in the third subframe using the third resource block according to the hopping pattern. This control channel may include essential control information that is associated with the uplink data channel transmitted by the fourth resource block and may also include other control information as needed. Thus, in this example, an uplink control channel is transmitted according to a predetermined hopping pattern regardless of the presence or absence of an uplink data channel. A hopping pattern is basically designed to transmit control channels using various frequencies and time slots and thereby to reduce interference on and from other channels so that the control channels are transmitted with desired quality. Faithfully following a hopping pattern as in this example makes it possible to fully receive the benefits (reducing interference on and from other channels) of using the hopping pattern. When different transmission periods are allocated to a control channel and a data channel as shown in the third subframe of FIG. 4, the user device can properly transmit the channels using a single carrier by switching the carrier frequency in the third subframe from the frequency of the third resource block to that of the fourth resource block.

Second Embodiment

In related art mobile communication systems, all resource blocks have the same size. In basic research for the present invention, the inventors paid attention to the relationships between resource block sizes and scheduling effect, signaling overhead, and resource use efficiency.

FIG. 5 is a table showing the relationships. As shown in the first row of the table, using a small resource block size makes it possible to finely allocate resource blocks according to channel conditions and thereby to greatly improve the throughput of the entire system. On the other hand, with a large resource block size, it becomes difficult to finely allocate resource blocks according to channel conditions and as a result, the degree of improvement in the system throughput becomes smaller. Generally, the channel fading is greater in the frequency direction than in the time direction. However, the relationship between resource block sizes and throughput shows substantially the same tendency in both directions.

Meanwhile, using a small resource block size increases the number of resource blocks and therefore increases the amount of scheduling information indicating which resource blocks are allocated to which users. Thus, as shown in the second row of the table, using a small resource block size increases the signaling overhead. On the other hand, using a large resource block size decreases the number of resource blocks and therefore decreases the signaling overhead.

As shown in the third row of the table, using a large resource size decreases the resource use efficiency in transmission of data with a small size (such as a control channel). This is because one resource block is used by one user. On the other hand, using an appropriately small resource block size makes it possible to reduce waste of resources.

Figure 6:
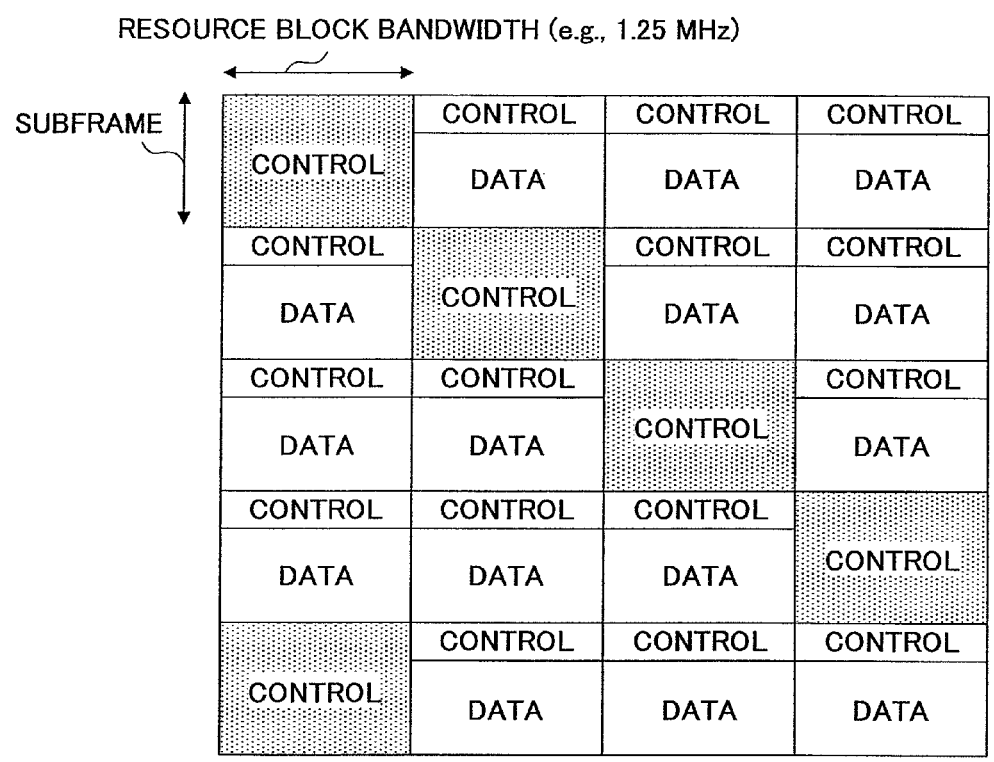
FIG. 6 is a drawing illustrating exemplary allocation of a frequency band used in a mobile communication system.
Figure 7:
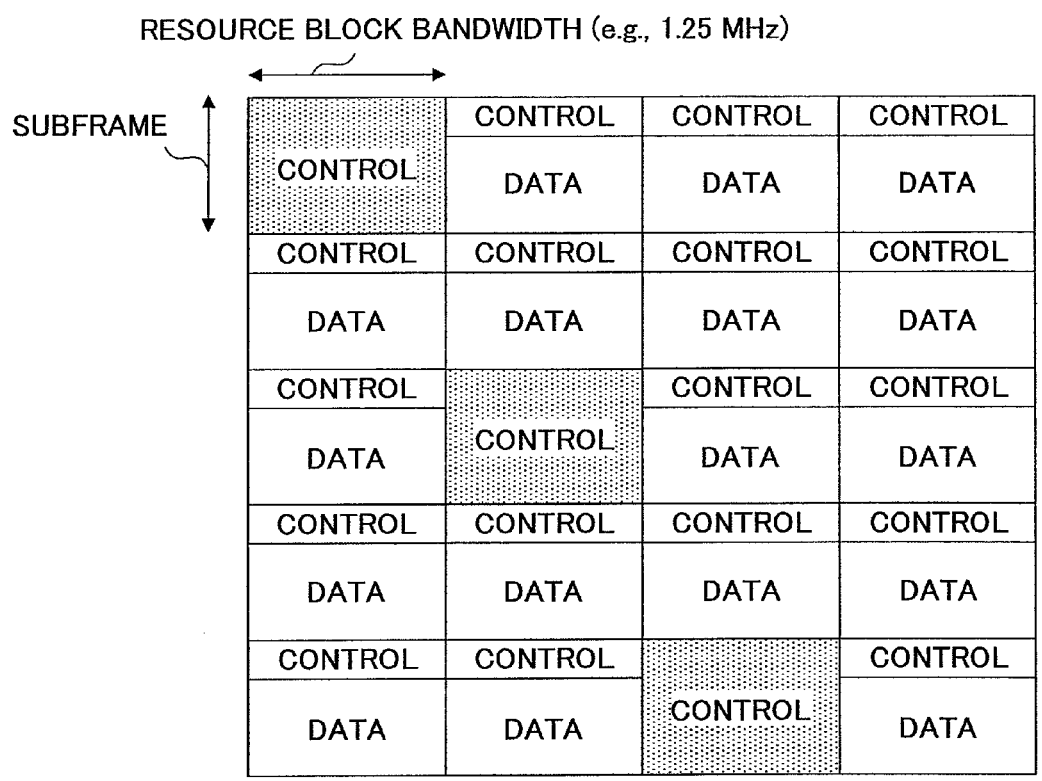
FIG. 7 is a drawing illustrating exemplary allocation of a frequency band used in a mobile communication system.

FIG. 6 shows an example where a control channel of a user device is transmitted using one or more of the shaded resource blocks. Because the size of a control channel is generally small, it may happen that a part of resources of respective resource blocks is wasted. This in turn decreases resources to be allocated to data channels. However, it is not a good idea to reduce the number of resource blocks or the allocation frequency of resource blocks for uplink control channels of a user device as shown in FIG. 7. Reducing the allocation frequency of resource blocks hampers smooth transmission of uplink control channels, i.e., reduces the data transmission efficiency. For example, reducing the allocation frequency may delay the transmission timing of control information, such as delivery confirmation information (ACK/NACK), that must be transmitted without delay.

Thus, it is difficult to determine a resource block size that satisfies all demands including improvement in system throughput, reduction of signaling overhead, and improvement in resource use efficiency. A second embodiment of the present invention makes it possible to solve or reduce this problem. In the second embodiment, appropriate resource blocks are selected from resource blocks with different sizes to reduce the signaling overhead, to improve the transmission efficiency of data with various sizes, and to improve the resource use efficiency.

Figure 8:
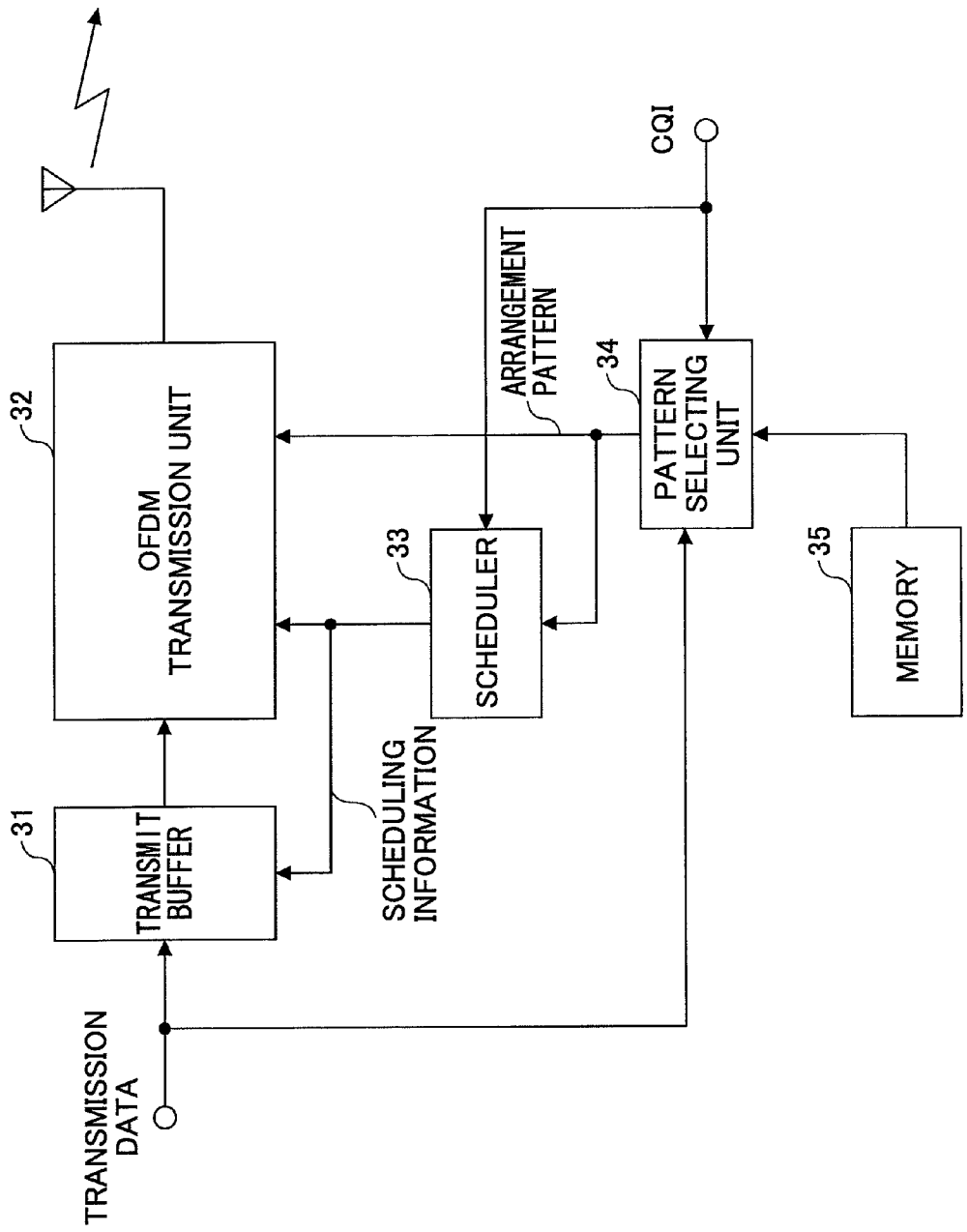
FIG. 8 is a block diagram illustrating a transmitting unit of a base station according to an embodiment of the present invention.

FIG. 8 is a block diagram illustrating a transmitting unit of a base station according to an embodiment of the present invention. The transmitting unit shown in FIG. 8 includes a transmit buffer 31, an OFDM transmission unit 32, a scheduler 33, a pattern selecting unit 34, and a memory 35.

The transmit buffer 31 temporarily stores downlink transmission data and outputs the data according to scheduling information.

The OFDM transmission unit 32 generates a transmission signal for wirelessly transmitting the downlink transmission data according to the scheduling information. More specifically, the transmission data are encoded at a specified channel coding rate, modulated by a specified data modulation scheme, OFDM-modulated by inverse fast Fourier transformation, and transmitted from an antenna together with an added guard interval. Downlink transmission data includes at least a downlink control channel and a downlink data channel. The downlink control channel includes information regarding uplink such as uplink scheduling information in addition to control information associated with the downlink data channel.

The scheduler 33 performs time scheduling and frequency scheduling for uplink and downlink based on downlink received signal quality (CQI) reported by user devices, uplink received signal quality measured by the base station, and reported resource block sizes, and outputs scheduling information. Specifically, the scheduler 33 performs scheduling based on the uplink and downlink CQIs such that resource blocks are allocated preferentially to users with good channel conditions. The scheduling information includes allocation information indicating which resource blocks are allocated to which users and information (MCS numbers) indicating combinations of modulation schemes and channel coding rates. The scheduler 33 may also be configured to perform scheduling taking into account, in addition to the CQIs, an indicator such as the amount of transmission data retained in the transmit buffer to achieve the fairness of scheduling.

The pattern selecting unit 34 selects a resource block size based on the size of transmission data and/or a CQI. In this embodiment, two sizes of resource blocks are provided and one or both of the two sizes of resource blocks are allocated to each user device.

The memory 35 stores resource block arrangement patterns. The resource block arrangement patterns and their use are described later.

Figure 9:
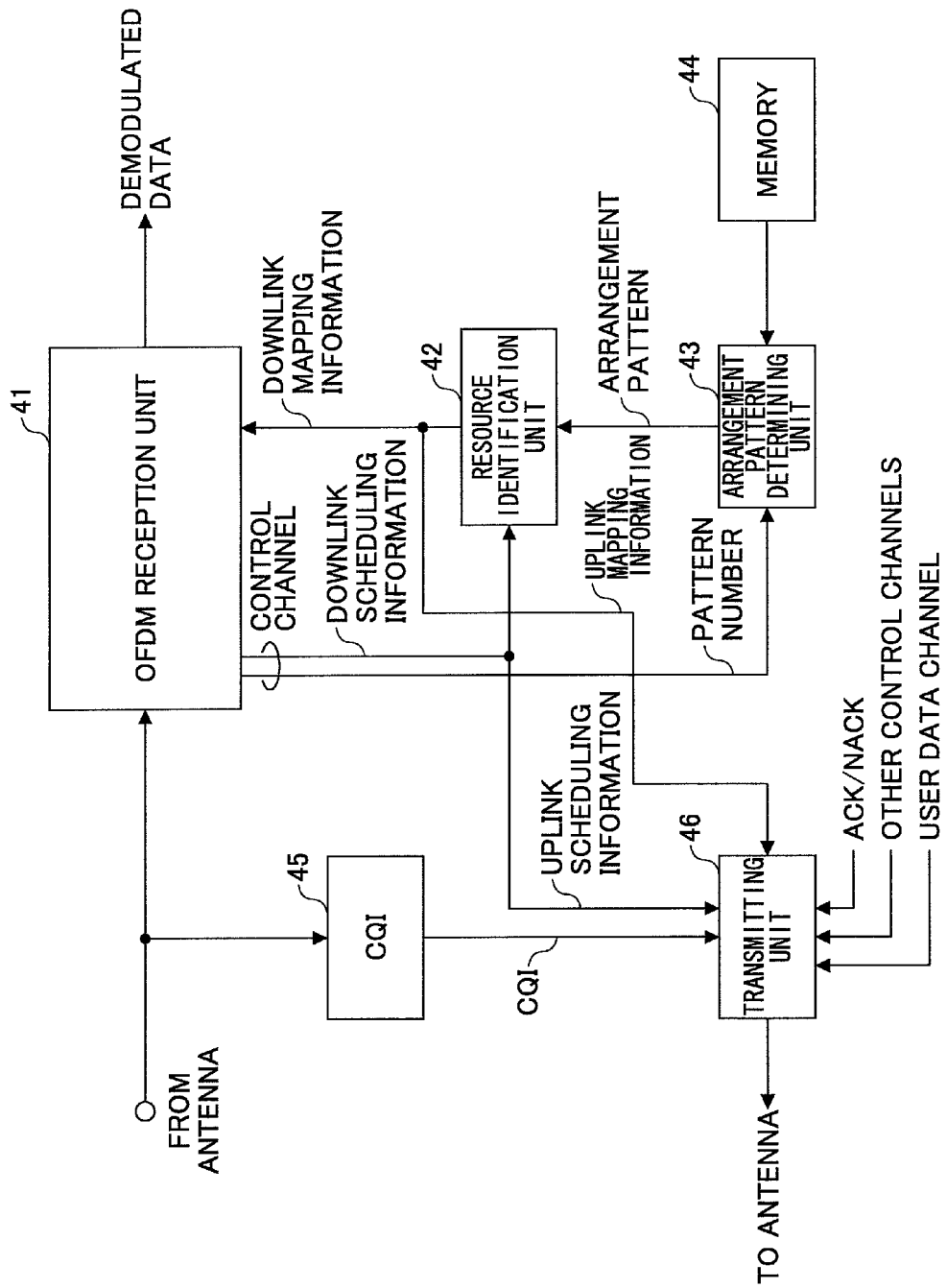
FIG. 9 is a block diagram illustrating a user device according to an embodiment of the present invention.

FIG. 9 is a block diagram illustrating a user device according to an embodiment of the present invention. The user device shown in FIG. 9 includes an OFDM reception unit 41, a resource identification unit 42, an arrangement pattern determining unit 43, a memory 44, a CQI measuring unit 45, and a transmitting unit 46.

The OFDM reception unit 41 extracts a control data channel and/or a traffic data channel from a received signal. More specifically, the OFDM reception unit 41 removes a guard interval from the received signal, fast-Fourier-transforms the signal for OFDM-demodulation, performs data demodulation and channel decoding on the transformed signal according to scheduling information sent from the base station, and thereby extracts a control data channel and/or a traffic data channel.

The resource identification unit 42 generates and outputs mapping information specifying positions of resource blocks in the time and frequency axes based on the scheduling information and a resource block arrangement pattern.

The arrangement pattern determining unit 43 retrieves a resource block arrangement pattern corresponding to a pattern number reported by the base station from the memory 44 and sends the retrieved resource block arrangement pattern to the resource identification unit 42.

In the memory 44, resource block arrangement patterns are stored in association with pattern numbers.

The CQI measuring unit 45 measures the CQI of a received signal. The measured downlink CQI is reported to the base station at predetermined intervals.

The transmitting unit 46 generates a transmission signal of uplink channels to be wirelessly transmitted from an antenna.

Figure 10:
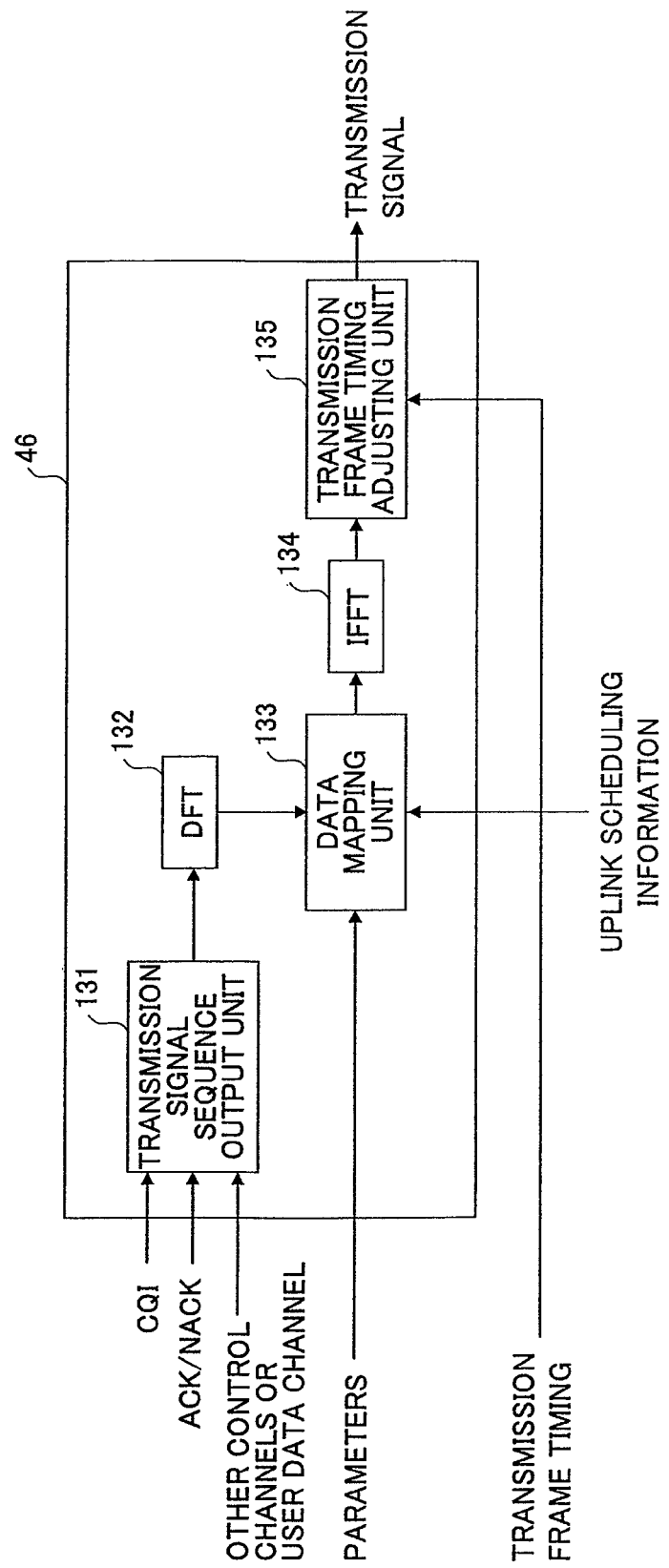
FIG. 10 is a block diagram illustrating a transmitting unit of a user device according to an embodiment of the present invention.

FIG. 10 is a functional block diagram illustrating a detailed configuration of the transmitting unit 46. As shown in FIG. 10, the transmitting unit 46 includes a transmission signal sequence output unit 131, a discrete Fourier transform unit (DFT) 132, a data mapping unit 133, an inverse Fourier transform unit 134, and a transmission frame timing adjusting unit 135.

The transmission signal sequence output unit 131 generates or outputs a transmission signal sequence. The transmission signal sequence may include any channel to be transmitted via uplink. In this embodiment, it is assumed that the transmission signal sequence output unit 131 outputs an uplink control channel and an uplink data channel. There are two types of uplink control channels: a control channel (essential control channel or first control channel) that always accompanies an uplink data channel and a control channel (second control channel) that is sent regardless of the presence or absence of an uplink data channel. CQI and ACK/NACK shown in FIG. 10 are examples of second control channels.

The discrete Fourier transform unit (DFT) 132 Fourier-transforms a transmission signal and thereby transforms the transmission signal from the time domain into the frequency domain.

The data mapping unit 133 maps the transmission signal to frequency components according to specified parameters. The parameters, for example, include a transmission bandwidth, a transmission band (frequency), and a repetition factor. Specifically, the data mapping unit 133 maps transmission signal components along the frequency axis based on the distributed FDM such that transmission signals of user devices with different bandwidths become orthogonal to each other.

The inverse Fourier transform unit 134 inverse-fast-Fourier-transforms the transmission signal having desired frequency components and thereby transforms the transmission signal from the frequency domain into the time domain.

The transmission frame timing adjusting unit 135 adjusts the transmission timing of the transmission signal and outputs the transmission signal. Particularly, when time division multiplexing (TDM) is used, the transmission frame timing adjusting unit 135 transmits the transmission signal at a timing corresponding to a transmission slot allocated to the user device.

An exemplary process according to this embodiment is described below with reference to FIGS. 8, 9, and 10. Downlink transmission data are stored in the transmit buffer 31 and are input to the OFDM transmission unit 32 according to downlink scheduling information. In the OFDM transmission unit 32, the transmission data are converted into a transmission signal for wireless transmission by channel coding, data modulation, mapping to resource blocks, and inverse fast Fourier transformation. Then, the transmission signal is transmitted from an antenna. Uplink scheduling information is transmitted to the user device via a downlink control channel. The uplink scheduling information and the downlink scheduling information each includes a channel coding scheme, a data modulation scheme, and allocated resource blocks. In this embodiment, resource blocks with different sizes are used according to need.

The user device demodulates a received signal and generates a transmission signal based on resource block arrangement patterns used by the base station. The pattern selecting unit 34 of the base station shown in FIG. 8 selects resource block arrangement patterns to be used and sends the selection result to the scheduler 33. The selection result (i.e., pattern numbers) and (uplink and downlink) scheduling information are sent to the user device via an appropriate control channel. The user device demodulates the control channel and thereby extracts the pattern numbers and the scheduling information. The pattern numbers are input to the arrangement pattern determining unit 43 shown in FIG. 9. The arrangement pattern determining unit 43 retrieves (uplink and downlink) resource block arrangement patterns corresponding to the pattern numbers and sends the retrieved resource block arrangement patterns to the resource identification unit 42. The resource identification unit 42 identifies resource blocks including data sent to the user device based on the downlink resource block arrangement pattern and the downlink scheduling information and reports the identified resource blocks to the OFDM reception unit 41. The resource identification unit 42 also identifies resource blocks used for uplink based on the uplink resource block arrangement pattern and the uplink scheduling information and reports the identified resource blocks to the transmitting unit 46. The OFDM reception unit 41 extracts and demodulates the data channel sent to the user device based on information sent from the resource identification unit 42. Meanwhile, the transmitting unit 46 generates a transmission signal based on the uplink scheduling information and the uplink mapping information.

Figure 11:
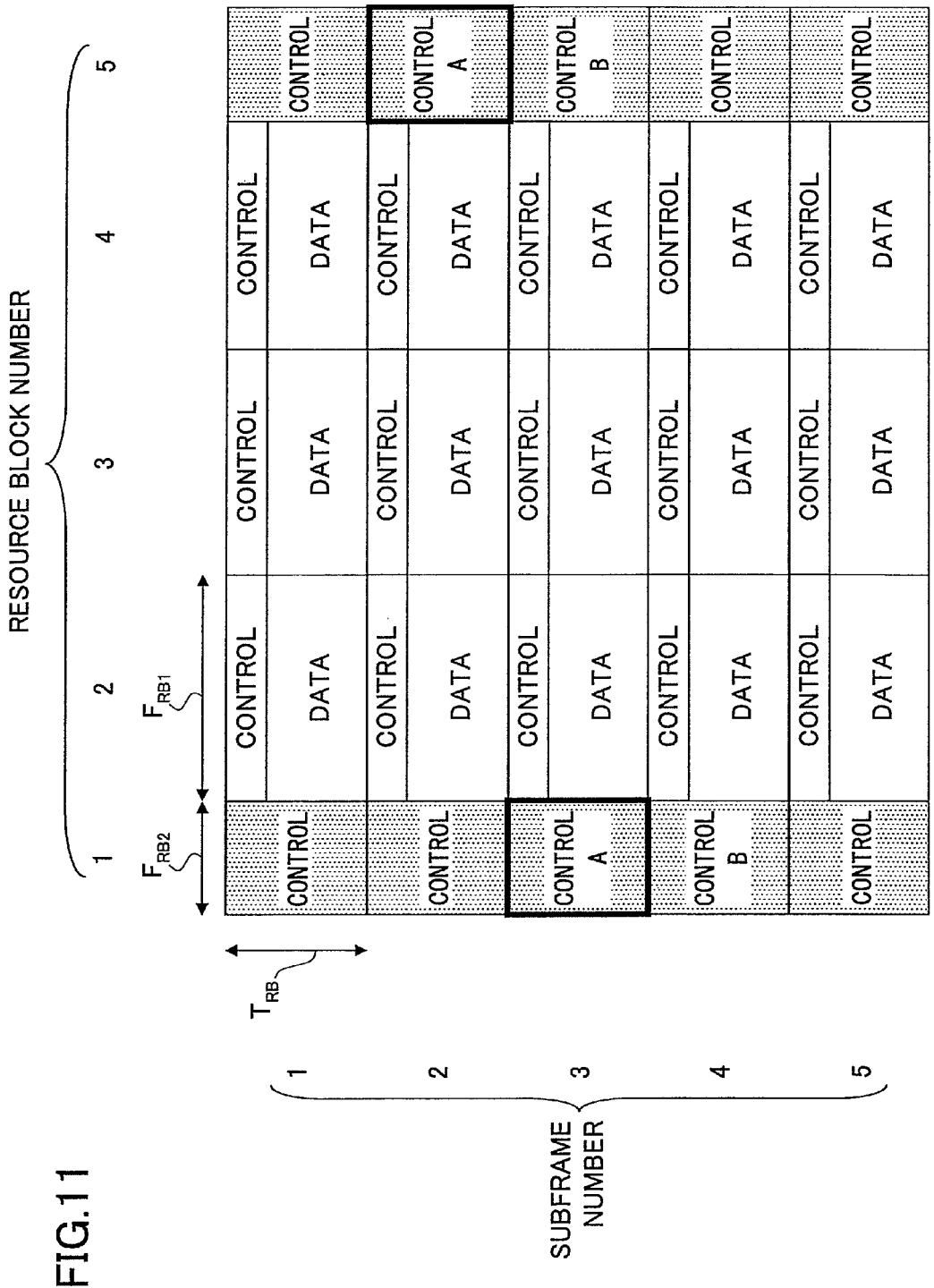
FIG. 11 is a drawing illustrating exemplary allocation of a frequency band used in a mobile communication system.

FIG. 11 is a drawing illustrating an uplink resource block arrangement pattern. The uplink resource block arrangement pattern shown in FIG. 11 includes two sizes of resource blocks (large resource blocks and small resource blocks). The large resource blocks have a bandwidth of 1.25 MHz and have a period of 0.5 ms. The small resource blocks have a bandwidth of 375 kHz and have a period of 0.5 ms. The number of sizes of resource blocks and their specific values are just examples and are not limited to those described above. In this example, five resource blocks are arranged in the frequency direction, the small resource blocks are situated at the right and left ends, and the resource blocks are arranged in the respective subframes according to the same arrangement pattern. Various arrangement patterns may be used to arrange resource blocks with different sizes as long as they are known to the sending and receiving ends. In FIG. 11, uplink scheduling is performed such that first control channels associated with uplink data channels and if necessary, second control channels are transmitted during corresponding periods in the large resource blocks (second, third, and fourth resource blocks); and second control channels, which are transmitted regardless of the presence or absence of uplink data channels, are transmitted using the small resource blocks (first and fifth resource blocks). The ratio of time occupied by a control channel to that occupied by a data channel in a large resource block may vary from user device to user device. The ratio may be changed according to the size of control information of each user device. A second control channel of a user device is transmitted using two small resource blocks. In this example, the second control channel of user device A is transmitted in the second subframe and the third subframe using the fifth resource block and the first resource block, respectively. Similarly, the second control channel of user device B is transmitted in the third subframe and the fourth subframe using the fifth resource block and the first resource block, respectively. Thus, according to the second embodiment, a second control channel is transmitted using multiple frequencies and time slots (i.e., the second control channel hops in the frequency and time directions). This method makes it possible to achieve frequency diversity gain and to increase the probability that a second control channel is properly demodulated by the base station. In this example, first control channels are transmitted using large resource blocks and second control channels are transmitted using small resource blocks. However, this distinction is not essential for the present invention and resource blocks may be used for any types of control channels.

In FIG. 11, it looks like each small resource block is exclusively used by the corresponding user device. For example, resource blocks labeled "Control A" look like they are exclusively used by user device A. However, this is not an essential feature of the present invention and a resource block may be shared by two or more user devices. For example, the fifth resource block in the second subframe may be shared by user devices A and C. In this case, for example, user devices A an C share the resource block by frequency division multiplexing.

Third Embodiment

Figure 12:
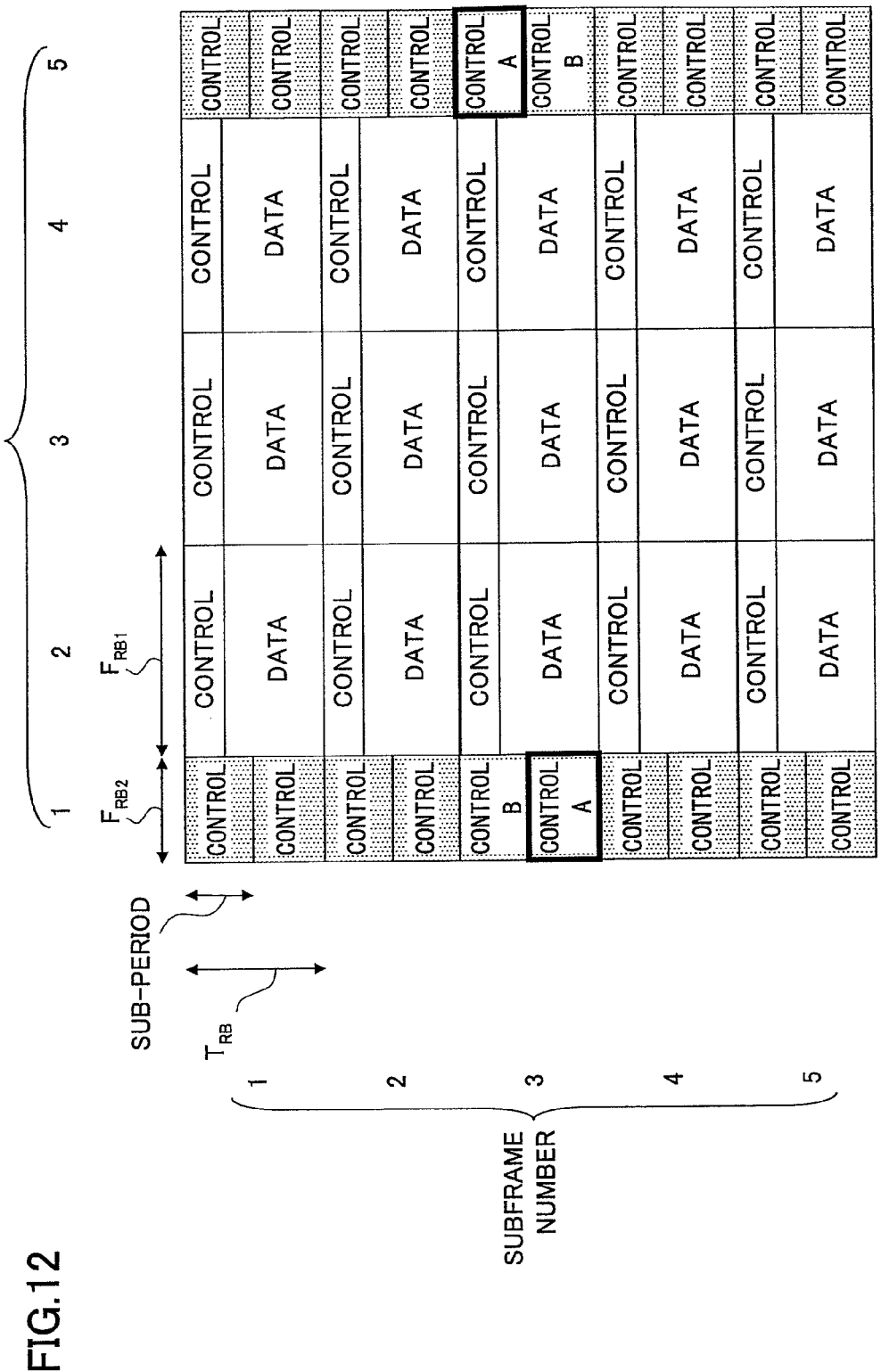
FIG. 12 is a drawing illustrating exemplary allocation of a frequency band used in a mobile communication system.

FIG. 12 is a drawing illustrating another uplink resource block arrangement pattern. As in FIG. 11, the uplink resource block arrangement pattern shown in FIG. 12 includes two sizes of resource blocks. In the third embodiment, a period TRB of each subframe of the small resource blocks (first and fifth resource blocks) is divided into two sub-periods. In this example, the second control channel of user device A is transmitted in a first sub-period and a second sub-period (a first half and a second half) of the third subframe using the fifth resource block and the first resource block, respectively. Similarly, the second control channel of user device B is transmitted in the first sub-period and the second sub-period of the third subframe using the first resource block and the fifth resource block, respectively. Thus, according to the third embodiment, a second control channel is transmitted using multiple frequencies and time slots (i.e., the second control channel hops in the frequency and time directions). This method makes it possible to achieve frequency diversity gain and to increase the probability that a second control channel is properly demodulated by the base station. Also, in this embodiment, transmission of a control channel of user device A is completed within one subframe and transmission of a control channel of user device B is also completed within one subframe. Therefore, this embodiment also makes it possible to reduce transmission delay of uplink control channels.

As in the above embodiment, a resource block may be shared by two or more user devices. For example, the fifth resource block in the first sub-period of the third subframe may be shared by user devices A and C. In this case, for example, user devices A an C share the resource block by frequency division multiplexing.

Figure 13:
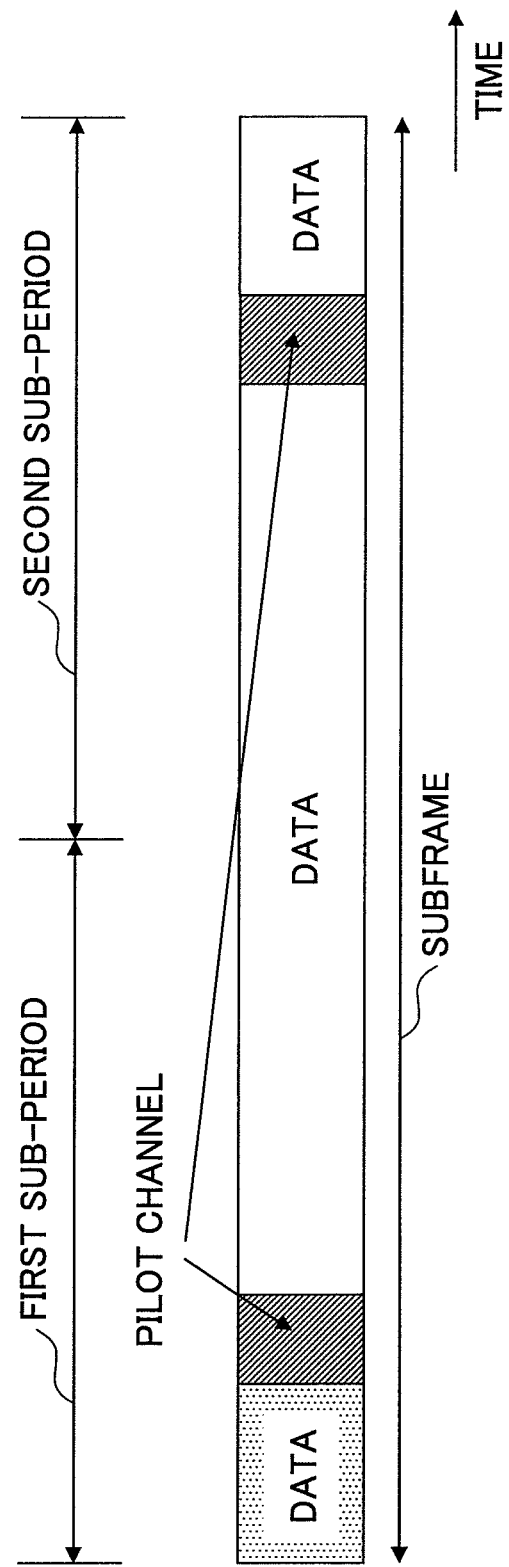
FIG. 13 is a drawing illustrating an exemplary transmission frame.

Theoretically, it is also possible to divide one subframe into more than two sub-periods. Each subframe shown in FIG. 12 typically has a structure as shown in FIG. 13. A pilot channel is included in each of the first and second sub-periods. This structure makes it possible to properly perform channel compensation for data (control channel) transmitted in either of the sub-periods by using the corresponding pilot channel. Here, if this subframe is divided into three sub-periods, a sub-period including no pilot channel is created. In this case, it is difficult to properly perform channel compensation for a channel transmitted in the sub-period including no pilot channel. Therefore, it is preferable to limit the number of sub-periods in a subframe to the number of pilot channels included in the subframe.

Fourth Embodiment

As described above, an uplink control channel includes either first control information that is associated with an uplink data channel or second control information that is sent regardless of the presence or absence of an uplink data channel. The second control information may be categorized into two types: information requiring immediacy and high reliability and information not requiring much immediacy and reliability. A typical example of the former information is delivery confirmation information (ACK/NACK) for a downlink data channel. Examples of the latter information include CQIs to be reported to the base station at intervals. The delivery confirmation information is essential to perform retransmission control. Depending on the content (ACK or NACK) of the delivery confirmation information, whether to retransmit a packet is determined. Therefore, the content of the delivery confirmation information greatly affects data throughput and delay time. For this reason, the delivery confirmation information is preferably transmitted in a highly reliable manner. Meanwhile, the delivery confirmation information normally has a very small data size and can be represented, for example, by one bit. This in turn makes it difficult to reliably correct the delivery confirmation information using an error-correcting code. In other words, even if the delivery confirmation information is transmitted together with other control information with a comparatively large data size, the reliability of the delivery confirmation information may not be as high as that of the other control information.

To solve or reduce this problem, in a fourth embodiment of the present invention, a control channel including delivery confirmation information (ACK/NACK) is code-division-multiplexed with other channels and control channels including information other than delivery confirmation information are multiplexed by frequency division multiplexing and/or time division multiplexing. The delivery confirmation information (ACK/NACK) having a small data size is spread with a high spreading ratio and is therefore its spreading gain is high. Thus, spreading delivery confirmation information is preferable to reliably transmit the delivery confirmation information to the base station. Also, a signal spread with such a high spreading ratio causes only a low noise level in other channels (e.g., data channel) that are code-division-multiplexed with the signal and therefore adverse effects of code division multiplexing are very small.

It is not necessary to fix a resource block used to code-division-multiplex the delivery confirmation information. In other words, the delivery confirmation information may be multiplexed in any resource block. Also, the resource block used to code-division-multiplex the delivery confirmation information may be changed as time passes according to a hopping pattern.

This method may also be applied to any other information (other than ACK/NACK) having a small data size (this size may be set at any value such as several bits or 10 bits) and requiring immediacy and high reliability. In this method, as described above, when first information having a small data size is to be transmitted with second information, the first information is code-division-multiplexed with other channels, and the second information is multiplexed with other channels by frequency division multiplexing and/or time division multiplexing.

Fifth Embodiment

In the example described with reference to FIG. 4, to solve or reduce a problem (degradation of uplink control channel quality) that may occur with the example shown in FIG. 3, an uplink control channel including the second control information of a user device is transmitted according to a hopping pattern regardless of the presence or absence of an uplink data channel. As an alternative method, the problem with the example shown in FIG. 3 may be solved or reduced by preventing allocation of resource blocks to a data channel under certain conditions.

Below, the method of this embodiment is described with reference to FIG. 12 based on the following assumption: if a user device has no uplink data channel (or if no resources are allocated to the uplink data channel), an uplink control channel (the second control channel including, for example, ACK/NACK or a CQI) of the user device is transmitted using small resource blocks (the first and fifth resource blocks); and if one or more of the second through fourth resource blocks are allocated to an uplink data channel of the user device, the uplink control channel is transmitted using the resource blocks allocated to the uplink data channel.

As an example, let us consider a case where an uplink control channel (the second control channel) of a user device is transmitted using the second resource block in the third subframe instead of using the fifth and first resource blocks in the third subframe (i.e., using a wider frequency band and within a shorter period of time). Transmitting an uplink control channel using the fifth and first resource blocks in the third subframe makes it possible to use higher transmission power because a narrower frequency band is used during each sub-period and also makes it possible to achieve frequency diversity gain because frequency hopping is performed using the fifth and first resource blocks. This in turn makes it possible to improve the reception quality of the uplink control channel at the base station. Meanwhile, transmitting an uplink control channel using the second resource block in the third subframe, i.e., using a wider frequency band and within a shorter period of time, decreases the instantaneous transmission power in the wider frequency band and decreases frequency diversity gain. As a result, if the channel conditions are not good enough, the reception quality of the uplink control channel may be reduced. Particularly, degradation of the reception quality of an uplink control channel is most likely to occur when resources (one or more of the second through fourth resource blocks) are allocated to an uplink data channel of a user device moving at high speed or located at a cell edge. As described above, a control channel is preferably transmitted with high transmission quality because it is normally not retransmitted. Especially, delivery confirmation information (ACK/NACK) for a downlink data channel must be transmitted to a base station correctly and without delay because it is an important parameter that directly affects data throughput.

For the above reasons, a base station in a fifth embodiment of the present invention performs uplink scheduling taking into account additional criteria. As in the above embodiments, the base station estimates uplink channel conditions of a user device based on the reception quality (CQI) of a pilot channel sent from the user device. In addition, the base station of this embodiment calculates the mobility of the user device and the distance between the base station and the user device. The mobility may be obtained by measuring the Doppler frequency of the user device. A high Doppler frequency indicates that the user device is moving at high speed. The distance between the user device and the base station may be estimated based on a path loss that is greatly affected by distance variation. A large path loss indicates that the user device is far from the base station. For example, the scheduler of the base station selects user devices as candidates for resource allocation based on their uplink channel conditions (CQIs). Among the selected user devices, the base station gives priority to user devices with smaller mobility and/or distances. For example, if two user devices have reported substantially the same channel quality (CQI), resources for a data channel are allocated preferentially to one of the user devices that is moving at a lower speed. As another example, if two user devices have reported substantially the same channel quality (CQI), resources for a data channel are allocated preferentially to one of the user devices that is located closer to the base station. In other words, resources for a data channel are not allocated to a user device having moderate channel conditions as well as moving at high speed or located at a cell edge. This method makes it possible to prevent degradation of the reception quality of an uplink control channel that may occur when resources (one or more of the second through fifth resource blocks) are allocated to an uplink data channel of a user device.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. The distinctions between the embodiments are not essential for the present invention, and the embodiments may be used individually or in combination. Although functional block diagrams are used to describe devices in the above embodiments, those devices may be implemented by hardware, software, or a combination of them.

The present international application claims priority from Japanese Patent Application No. 2006-169427 filed on Jun. 19, 2006, and Japanese Patent Application No. 2006-225918 filed on Aug. 22, 2006, the entire contents of which are hereby incorporated herein by reference.

The invention claimed is:

1. A user device for a mobile communication system employing a single carrier scheme for uplink,
   an uplink system frequency band of the mobile communication system including a first resource block located at a low-frequency end of the uplink system frequency band, a second resource block located at a high-frequency end of the uplink system frequency band, and multiple resource blocks between the first resource block and the second resource block,
   the user device comprising:
   a mapping unit configured to map an uplink control channel to the first resource block or the second resource block; and
   a transmitting unit configured to transmit the mapped uplink control channel, wherein
   the mapping unit is configured to map an uplink data channel to at least one of the resource blocks between the first resource block and the second resource block,
   the transmitting unit is configured to also transmit the mapped uplink data channel, and
   when each subframe on a time axis is divided into two sub-periods, the mapping unit is configured to map the uplink control channel to the first resource block located at the low-frequency end of the uplink system frequency band in a first one of the two sub-periods and to map the uplink control channel to the second resource block located at the high-frequency end of the uplink system frequency band in a second one of the two sub-periods, and the mapping unit does not map the uplink data channel to the first resource block and the second resource block.

2. The user device as claimed in claim 1, wherein the transmitting unit is configured to not transmit the uplink control channel at a same time as the uplink data channel.

3. The user device as claimed in claim 2, wherein if control information exists when the uplink data channel is to be mapped by the mapping unit, the control information is included in the uplink data channel; and
    if the control information exists when the uplink data channel is not to be mapped by the mapping unit, the control information is included in the uplink control channel.

4. The user device as claimed in claim 1, wherein processing for code division multiplexing is performed on the uplink control channel to be mapped by the mapping unit.

5. A communication method performed by a user device for a mobile communication system employing a single carrier scheme for uplink,
    an uplink system frequency band of the mobile communication system including a first resource block located at a low-frequency end of the uplink system frequency band, a second resource block located at a high-frequency end of the uplink system band, and multiple resource blocks between the first resource block and the second resource block,
    the communication method comprising the steps of:
    mapping an uplink control channel to the first resource block or the second resource block; and
    transmitting the mapped uplink control channel, wherein
    in the mapping step, an uplink data channel is mapped to at least one of the resource blocks between the first resource block and the second resource block,
    in the transmitting step, the mapped uplink data channel is also transmitted, and
    when each subframe on a time axis is divided into two sub-periods, in the mapping step, the uplink control channel is mapped to the first resource block located at the low-frequency end of the uplink system frequency band in a first one of the two sub-periods and mapped to the second resource block located at the high-frequency end of the uplink system frequency band in a second one of the two sub-periods, and the mapping step does not map the uplink data channel to the first resource block and the second resource block.

6. The communication method as claimed in claim 5, wherein in the transmitting step, the uplink control channel is not transmitted at a same time as the uplink data channel.

7. The communication method as claimed in claim 6, wherein if control information exists when the uplink data channel is to be mapped in the mapping step, the control information is included in the uplink data channel; and if the control information exists when the uplink data channel is not to be mapped in the mapping step, the control information is included in the uplink control channel.

8. The communication method as claimed in claim 5, wherein processing for code division multiplexing is performed on the uplink control channel to be mapped in the mapping step.

9. A mobile communication system employing a single carrier scheme for uplink, comprising:
    a user device configured to transmit a signal based on the single carrier scheme; and
    a base station configured to receive the signal from the user device,
    wherein
    an uplink system frequency band of the mobile communication system includes a first resource block located at a low-frequency end of the uplink system frequency band, a second resource block located at a high-frequency end of the uplink system frequency band, and multiple resource blocks between the first resource block and the second resource block;
    the user device includes a mapping unit configured to map an uplink control channel to the first resource block or the second resource block, and a transmitting unit configured to transmit the mapped uplink control channel;
    the mapping unit is configured to map an uplink data channel to at least one of the resource blocks between the first resource block and the second resource block,
    the transmitting unit is configured to also transmit the mapped uplink data channel, and
    when each subframe on a time axis is divided into two sub-periods, the mapping unit is configured to map the uplink control channel to the first resource located at the low-frequency end of the uplink system frequency band in a first one of the two sub-periods and to map the uplink control channel to the second resource block located at the high-frequency end of the uplink system frequency band in a second one of the two sub-periods, and the mapping unit does not map the uplink data channel to the first resource block and the second resource block.

10. A base station for a mobile communication system employing a single carrier scheme for uplink,
    an uplink system frequency band of the mobile communication system including a first resource block located at a low-frequency end of the uplink system frequency hand, a second resource block located at a high-frequency end of the uplink system frequency band, and multiple resource blocks between the first resource block and the second resource block,
    the base station comprising:
    a scheduler configured to allocate the first resource block or the second resource block to an uplink control channel; and
    a receiving unit configured to receive the uplink control channel in the first source block or the second resource block allocated by the scheduler, wherein
    the scheduler is configured to allocate at least one of the resource blocks between the first resource block and the second resource block to an uplink data channel,
    the receiving unit is configured to receive the uplink data channel in the at least one of the resource blocks allocated by the scheduler, and
    when each subframe on a time axis is divided into two sub-periods, the receiving unit is configured to receive the uplink control channel in the first resource block located at the low-frequency end of the uplink system frequency band in a first one of the two sub-periods and to receive the uplink control channel in the second resource block located at the high-frequency end of the uplink system frequency band, in a second one of the two sub-periods, and the receiving unit does not receive the uplink data channel in the first resource block and the second resource block.

11. The base station as claimed in claim 10, wherein the receiving unit is configured to receive the uplink control channel from a user device when the uplink data channel is not being received from the user device.

12. The base station as claimed in claim 11, wherein
    if control information exists at the user device when the uplink data channel is to be received by the receiving unit, the control information is included in the uplink data channel; and if control information exists at the user device when the uplink data channel is not to be received by the receiving unit, the control information is included in the uplink control channel.

13. A method performed by a base station for a mobile communication system employing a single carrier scheme for uplink,
an uplink system frequency band of the mobile communication system including a first resource block located at a low-frequency end of the uplink system frequency band, a second resource block located at a high-frequency end of the uplink system frequency band, and multiple resource blocks between the first resource block and the second resource block,
the method comprising:
allocating the first resource block or the second resource block to an uplink control channel;
receiving the uplink control channel in the first source block or the second resource block that is allocated;
allocating at least one of the resource blocks between the first resource block and the second resource block to an uplink data channel; and
receiving the uplink data channel in the at least one of the resource blocks that is allocated,
wherein when each subframe on a time axis is divided into two sub-periods, the uplink control channel is received in the first resource block located at the low-frequency end of the uplink system frequency band in a first one of the two sub-periods and the uplink control channel is received in the second resource block located at the high-frequency end of the uplink system frequency band in a second one of the two sub-periods, and the uplink data channel is not received in the first resource block and the second resource block.

14. The method as claimed in claim 13, wherein the uplink control channel is received from a user device when the uplink data channel is not being received from the user device.

15. The method as claimed in claim 14, wherein
if control information exists at the user device when the uplink data channel is to be received, the control information is included in the uplink data channel; and
if control information exists at the user device when the uplink data channel is not to be received, the control information is included in the uplink control channel.

* * * * *